Patented Aug. 3, 1937

2,089,101

UNITED STATES PATENT OFFICE 2,089,101

COATINGS FOR WELDING ELECTRODES

Albert Roux, Enghien, France, assignor to l'Air Liquide, Societe Anonyme pour l'Etude et l'Exploitation des Procedes Georges Claude, Paris, France No Drawing. Application May 18, 1934, Serial No. 726,305. In Germany November 2, 1933

5 Claims. (Cl. 219—8)

This invention relates to coatings for arc welding electrodes, such coatings yielding by their decomposition by the heat of the arc or by their combustion gases which protect from the influences of the surrounding atmosphere the metal at the place of the welding and the metal of the electrode when the electrode is made of metal.

According to the present invention, it has been ascertained that for such coatings use could be made of cellulosic compounds which present themselves under the form of an impalpable powder, the hydrocelluloses and oxycelluloses, and which are employed in admixture with one or more convenient binding materials in order to form a homogeneous paste into which it is only necessary, for obtaining the coated electrode, to dip the electrode rod which is made of metal or of carbon; the coated rod is then dried or evaporated to cause the paste to become solid and to adhere to the welding rod. The hydrocellulose and the oxycellulose are the known products of degradation of cellulose by chemical agents. The hydrocellulose results from the attack of cellulose in the heat by mineral acids, such as oxygenated acids or halogen acids; the oxycellulose results from the attack of the cellulose by oxidizing agents, such as hypochlorite of calcium or permanganate of potassium. The results thus obtained in the welding operation are at least equal to those obtained with the coatings which comprise cellulosic material. When this material is used under the form of yarns or cords, it is necessary to wind it round the welding rod thus necessitating a relatively costly operation which is avoided by the present invention; when the cellulosic material is used under a powder form, practically sawdust, this powder swells under the action of the binding material which it is necessary to add and does not permit to make a coating of a thickness sufficiently constant for the combustion of the coating to proceed regularly across the whole transversal section of the electrode.

The materials used according to the present invention which are easily formed into a paste do not have this drawback, provided that care is taken that the filaments which enter their constitution are sufficiently short as can be ascertained by the microscope.

In order to use the hydrocelluloses and oxycelluloses, they are incorporated into an adhesive bath, preferably an alkaline silicate. The last material has together the effect of retarding the combustion of the hydrocellulose or oxycellulose, but this result could be obtained independently of the adhesive bath by the addition of other substances, boric acid, kaolin for instance, which act as fire proof materials.

Of course, if necessary, there can be added to the paste the usual substances, ferro-manganese, talc for instance, which add by the formation of slag their action to the action of the protecting gases or which introduce special elements into the deposited metal.

I claim:

1. A coating for arc welding electrodes which comprises an ingredient evolving in the arc a protective gaseous atmosphere and constituted by a degradation product of cellulose resulting as a powder from such action of chemical agents upon cellulose that avoids any substantial substitution of a group of atoms of the said chemical agents for the hydroxyl radical of the cellulose, and a binding material for holding said ingredient around the length of the core of the electrode.

2. A coating for arc welding electrodes which comprises an ingredient evolving in the arc a protective gaseous atmosphere and constituted by a fibrous material resulting from such action of chemical agents upon cellulose that avoids any substantial substitution of a group of atoms of the said chemical agents for the hydroxyl radical of the cellulose and a binding agent for said fibrous material, the fibres of said material being sufficiently short to allow this material to form with the said binding agent a homogeneous paste remaining homogeneous along the welding rod after dipping said rod in said paste.

3. A coating for arc welding electrodes which comprises an ingredient evolving in the arc a protective gaseous atmosphere and constituted by hydrocellulose, and a binding material for holding said ingredient around the length of the core of the electrode.

4. A coating for arc welding electrodes which comprises an ingredient evolving in the arc a protective gaseous atmosphere and constituted by oxycellulose, and a binding material for holding said ingredient around the length of the core of the electrode.

5. A coating for arc welding electrodes which comprises oxycellulose.

ALBERT ROUX.